E. F. BREDEHOFT.
ACCOUNT BOOK.
APPLICATION FILED APR. 4, 1914.
1,158,892.
Patented Nov. 2, 1915.
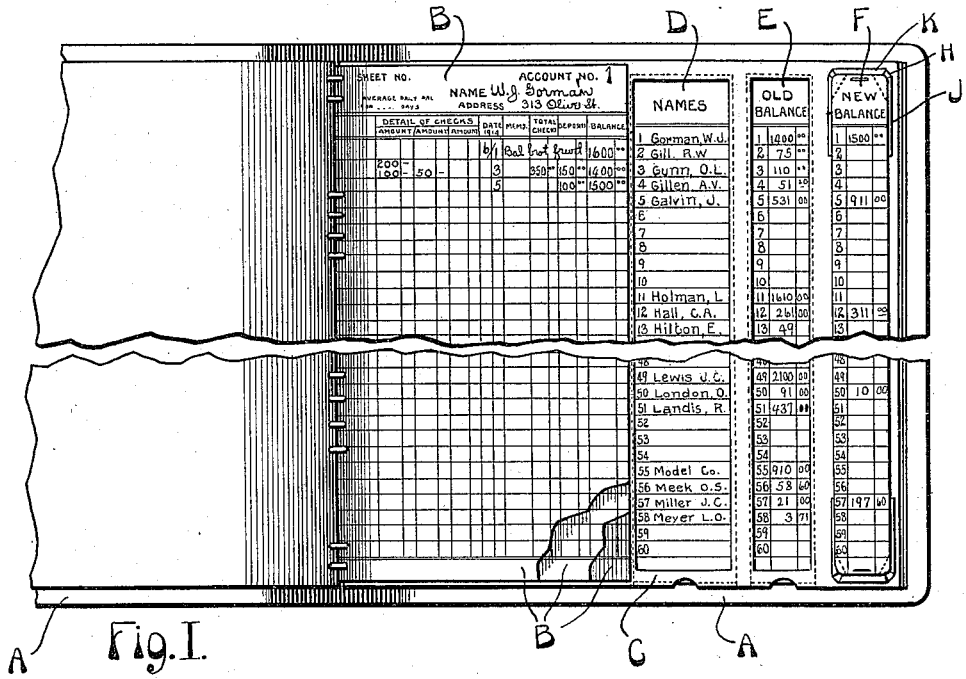
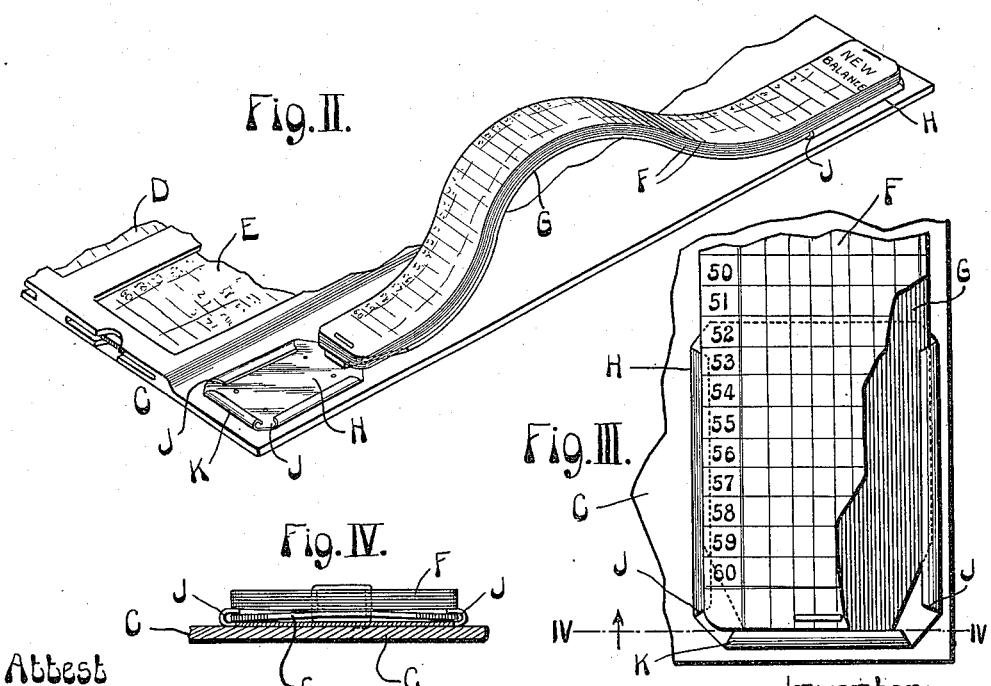
Attest
a.j. McCauley
Walter Allen
Inventor:
E. F. Bredehoft
by Knight & Cook Attys

UNITED STATES PATENT OFFICE.

EDWARD F. BREDEHOFT, OF ST. LOUIS, MISSOURI.

ACCOUNT-BOOK.

1,158,892.  Specification of Letters Patent.  Patented Nov. 2, 1915.

Application filed April 4, 1914. Serial No. 829,476.

*To all whom it may concern:*

Be it known that I, EDWARD F. BREDEHOFT, a citizen of the United States of America, residing in the city of St. Louis and State of Missouri, have invented a certain new and useful Improvement in Account-Books, of which the following is a full, clear, and exact description, reference being had to the accompanying drawings, forming a part of this specification.

My invention relates to an account book and the improvement lies more particularly in a device adapted to be attached to or associated with an account book.

The preferred form of the invention comprises a series of sheets which I term "new balance sheets" detachably secured to each other and preferably in the form of a tablet detachably secured to a holder. The holder is preferably provided with a "name sheet" and an "old balance sheet" alined with the "new balance sheets," and if desired this holder and the various sheets referred to may form part of a loose leaf ledger provided with suitable account leaves. Where the ledger is to be used by a banking concern in keeping a record of the deposits and withdrawals of its depositors, a full record of each account is inscribed on the ledger leaves, and each account is given a number which also appears on the ledger leaves. The "name sheet" is provided with the names of the depositors together with a row of consecutive numbers indicating the number of each depositor's account. The "old balance sheet" is provided with a row of consecutive numbers alined with the corresponding numbers on the "name sheet," and the "old" balance of each account appears opposite the consecutive numbers on the "old balance sheet." By the term "old balance" I mean the balance as it stood at the beginning of the day's business. During each day the balance of certain accounts will of course be changed by deposits and withdrawals and the main feature of my invention lies in a device which is used at the close of each day's business when the new balances are found and entered upon the records. The balance of each account which has changed during the day is entered upon a "new balance sheet," the latter being provided with a row of consecutive numerals indicating the numbers of the accounts, and when a new balance is found it is entered on the "new balance sheet" at a point opposite the number of the account having the new balance.

After the new balances have been entered upon the "new balance sheet" the total amount of the day's transactions may be very easily found by a simple calculation involving only the balances which have changed during the day. The active account, *i. e.* the accounts having a new balance, may be readily found by referring to the "new balance sheet." To find the total amount of the day's transactions the "old balances" of the active accounts are added together, and the sum of the "new balances" of the same accounts may be compared with the sum of said "old balances" to find the total increase or decrease in the deposits at the end of the day. After making such calculations the "old balances" of the active or changed accounts are erased from the "old balance sheet" and the new balances are substituted therefor. The accounting is then complete. The "new balance sheet" has served its purpose and should be removed from the book.

In accordance with my invention a series of the "new balance sheets" are detachably secured to each other, said new balance sheets being preferably in the form of a tablet so that each of the sheets may be readily torn from the book after it has served its purpose, and when all of the "new balance sheets" have been removed a new tablet of such sheets may be easily secured to the book, as will be hereinafter fully explained.

Figure I is a fragmentary top or plan view of a loose leaf ledger embodying the features of my invention. Fig. II is a perspective view illustrating a portion of a holder provided with fastening devices for the reception of the tablet formed by the "new balance sheets," the tablet shown in this view being secured to a fastening device at one end of the holder and the middle portion of the tablet being bowed from the holder so that its free end will enter the fastening device at the lower end of the holder. Fig. III is a fragmentary top or plan view showing one end of the tablet and one of the fastening devices for securing the tablet to the holder. Fig. IV is a transverse section taken approximately on the line IV—IV, Fig. III.

In the accompanying drawings: A designates the covers of a loose leaf ledger, B designates the account leaves, and C is a holder in the form of a stiff leaf secured to the ledger. The holder C extends beyond the side edges of the account leaves and is provided with guideways in which a name sheet D is removably mounted. An old balance sheet E is also removably mounted in the holder C.

Where the device is used in the bookkeeping of a banking concern the names of the depositors are written upon the account leaves and each account is given a number, for example, as shown in Fig. I, the account of W. J. Gorman is numbered "1". The account leaves are also provided with suitable entries including the balances shown at the right hand side of the account leaf seen in Fig. I.

The name sheet D is provided with the name of the depositors as well as a row of consecutive numbers indicating the account numbers of the different accounts, the account of W. J. Gorman being numbered "1" at the top of the name sheet.

The old balance sheet E is provided with a row of consecutive numbers indicating the numbers of the accounts, said consecutive numbers being alined with corresponding numbers on the name sheet. The old balance sheet is also provided with entries which I term "old balances."

A series of new balance sheets F are secured to a comparatively stiff backing member G, said sheets being in the form of a tablet detachably secured to the holder C as will be hereinafter described. Each new balance sheet is provided with a row of consecutive numerals alined with the corresponding numerals on the old balance sheet E and name sheet D.

Referring now to the entry at the top of the old balance sheet, it will be noted that the old balance of account number 1 is 1400.00, and the new balance sheet shows that the new balance of this account is 1500.00. These figures are also found at the right hand side of the account leaf numbered "1". The entries on the old balance sheet show the balances at the beginning of a day while the new balance sheet shows the balances which have changed by deposits or withdrawals during the day. The new balances are first entered on the account leaf B and then written upon the new balance sheet at points directly opposite to the old balances of the accounts to which they refer. As before pointed out the old and new balances of the active or changed account may then be added and the totals compared with each other to determine the amounts involved in the transactions of the day, and the total increase or decrease in the deposits may be found by subtracting the sum of one of the balances from the sum of the other balances.

The figures showing the old balances are written in lead pencil on the old balance sheet E and after all of the necessary calculations have been made, the figures showing the old balances of the active accounts are erased and the new balances are substituted therefor. The new balance sheet F is then torn from the tablet, leaving a new sheet exposed for the new balances to be found at the end of the next day.

To detachably secure the new balance sheet tablet to the holder C, I preferably provide the holder with a pair of sheet metal fastening devices H adapted to receive the ends of the tablet. Each fastening device H is flanged at its side edges to produce a pair of guideways J and an abutment K is formed at the outer end of the device. The inner ends of the guideways J are open to receive the wedge shaped ends of the backing strip G, and the new balance sheet tablet may be readily secured to the holder C by inserting the wedge shaped ends of the backing strip G into the guideways J as shown in Fig. II. The abutments K at the ends of the fastening devices H serve as stops for limiting the movement of the balance sheet tablet and also serve to retain the new balance sheets F in alinement with the old balance sheet E. It will be noted that my new balance sheet tablet is an inexpensive device which may be readily secured to the devices H, in which position the series of new balance sheets F are firmly held in alinement with the old balance sheet.

It is to be understood that this invention is not limited to the exact system of bookkeeping I have described, nor to the exact structure shown. Any suitable number of holders C may be used and any desired words or numerals may be written or printed upon the sheets which I have termed "balance sheets".

I claim:—

In a device of the character described the combination of a holder, an old balance sheet secured to said holder, a series of superposed new balance sheets ruled transversely to form a row of spaces, the side edges of all of the new balance sheets being in alinement with the side edges of said old balance sheet, the said superposed new balance sheets being in the form of a tablet so that the uppermost sheet may be readily removed to expose another new balance sheet which is alined with the side edges of said old balance sheet, the said old balance sheet being substantially equal, in length and width, to each of the new balance sheets so that the old and new balance sheets form companion columns which may be readily compared with each other for the purpose described, and means for securing said tablet to said holder so as to maintain the side edges of all of said new balance sheets in alinement with said old balance sheet.

EDWARD F. BREDEHOFT.

In the presence of—
E. K. CLARK,
A. J. MCCAULEY.

Copies of this patent may be obtained for five cents each, by addressing the "Commissioner of Patents, Washington, D. C."